United States Patent [19]

Kuwabara et al.

[11] Patent Number: 5,065,445
[45] Date of Patent: Nov. 12, 1991

[54] APPARATUS FOR EXPANDING AND FORMATTING RUNLENGTH DATA FOR MULTIPLE EXPOSURE BEAMS

[75] Inventors: Akira Kuwabara; Yasufumi Koyama, both of Kyoto, Japan

[73] Assignee: Dainippon Screen Mfg. Co., Ltd., Kyoto, Japan

[21] Appl. No.: 222,431

[22] Filed: Jul. 19, 1988

[30] Foreign Application Priority Data

Jul. 20, 1987 [JP] Japan .................................. 62-179061

[51] Int. Cl.$^5$ ........................ G06K 9/36; G06K 9/46; H04N 1/419; G01D 9/42
[52] U.S. Cl. ................................. 382/56; 358/261.1; 358/403; 346/108
[58] Field of Search ................. 382/56; 358/403, 404, 358/261.1, 261.4, 78, 75; 346/108, 160; 364/519

[56] References Cited

U.S. PATENT DOCUMENTS

| | | | |
|---|---|---|---|
| 4,441,208 | 4/1984 | Iida | 382/56 |
| 4,454,575 | 6/1984 | Bushaw et al. | 358/403 |
| 4,554,561 | 11/1985 | Daniele et al. | 346/108 |
| 4,571,633 | 2/1986 | Kondo | 358/78 |
| 4,760,459 | 7/1988 | Sato et al. | 358/261.1 |
| 4,843,632 | 6/1989 | Lee et al. | 358/261.1 |
| 4,885,576 | 12/1989 | Pennebaker et al. | 382/56 |

FOREIGN PATENT DOCUMENTS 200885 2/1986 European Pat. Off. .
61-212895 3/1985 Japan .

Primary Examiner—Leo H. Boudreau
Assistant Examiner—Michael R. Cammarata
Attorney, Agent, or Firm—Lowe, Price, LeBlanc and Becker

[57] ABSTRACT

An image data processing apparatus for generating a dot data, which is converted from a runlength data, to control multi-channel exposure beams which record image patterns through scanning, having a converter for generating a dot signal which corresponds to a length of an exposure portion designated by the runlength data, and a memory block for forming the dot data by storing the dot signals in M scanning lines, where M is the number of the exposure beams. Then it generates the dot data which corresponds to the number of the exposure beams.

9 Claims, 5 Drawing Sheets

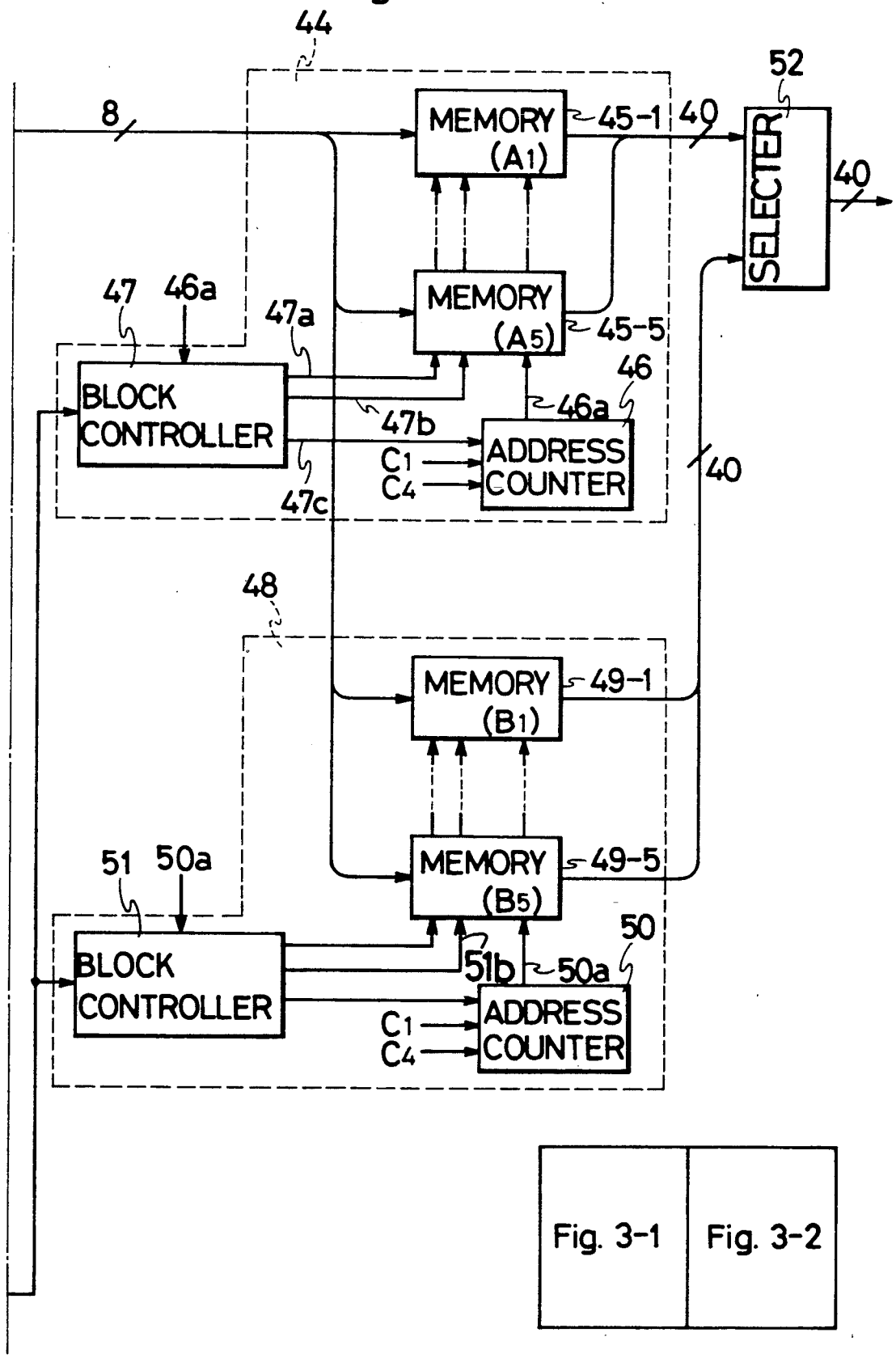

Fig. 4
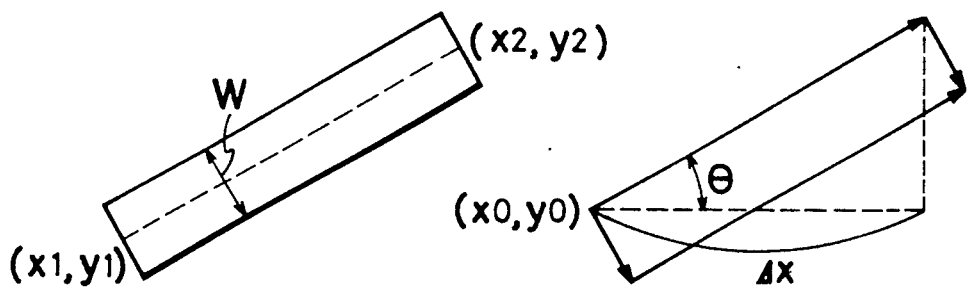
Fig. 5
Fig. 6
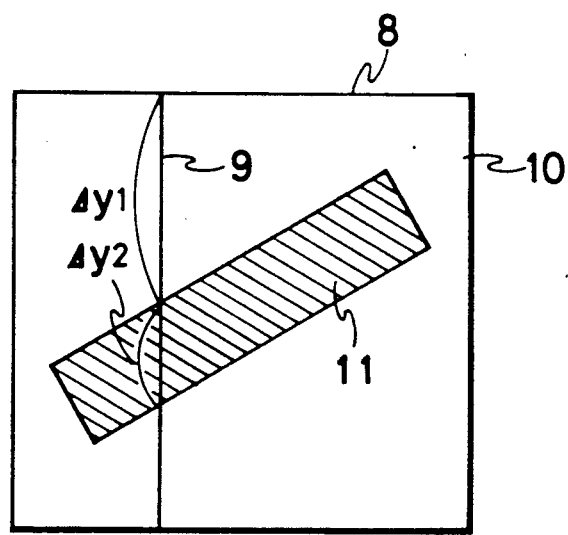

APPARATUS FOR EXPANDING AND FORMATTING RUNLENGTH DATA FOR MULTIPLE EXPOSURE BEAMS

BACKGROUND OF THE INVENTION

The present invention relates generally to an improvement of an apparatus for reproducing an image on a recording medium by using multi-channel exposure beams, and more particularly, to an image data processing apparatus which generates dot data to control each exposure beams.

There has been known an apparatus which can reproduce an image, according to image data stored in a memory device, on the recording medium by controlling the multi-channel exposure beams.

In the conventional apparatus of this kind, the image data is stored in the memory device such as Magnetic Tape, wherein the image data is generally created by a CAD system and hence called a "CAD data". The apparatus has some converters which convert the CAD data into an object data. Namely the CAD data is converted into a runlength data by way of a vector data, and finally the runlength data is converted into a dot data by a multi dot data converter. The multi dot data converter consists of a plurality of conversion units involved in a memory circuit and a converting circuit, wherein the number of the conversion units corresponds to the number of the exposure beams. Then the dot data is used in controlling the multi-channel exposure beams.

Recently, it is required to increase the number of channels of the exposure beams in order to shorten the exposure time for reproducing an image.

The above-mentioned conventional apparatus, however, has disadvantages of increases in the cost of producing the apparatus and in the time to maintain the apparatus. This is because the number of components which constitute the apparatus, the time for producing and adjusting the apparatus are increased naturally in the conventional apparatus. If the number of components is increased, the number of conversion units also must be increased to control each exposure beam. For example, if forty-channel exposure beams are applied in the conventional apparatus, forty conversion units are necessary.

SUMMARY OF THE INVENTION

Accordingly, the present invention has been developed in view of substantially eliminating the above described disadvantages inherent in the prior art. The essential object of the invention is to provide an improved image data processing apparatus which consists of a smaller number of components even though the number of exposure beams is increased.

Another object of the present invention is to provide an improved image data processing apparatus which can convert the runlength data into the dot data effectively.

The above-mentioned objects are accomplished by the present invention, with an image data processing apparatus for generating a dot data, which is converted from a runlength data based on an image data, to control multi-channel exposure beams which records an image through scanning which includes a converter responsive to the runlength image data for generating a dot signal, wherein one state of the dot signal and the length of said one state correspond to the runlength data; and a memory means storing dot data in M scanning line format, where M is the number of the exposure beams.

It is preferable that the memory means includes a plurality of memory devices for storing the dot data in the form of M scanning lines; a block controller for controlling each the memory device to operate on writing and reading; and an address counter for designating an address of each the memory device.

It is also preferable that the memory means has a pair of memory blocks which operate alternately on storing the dot signals and generating the dot data. In this case, it is preferable that the converter generates a select signal which selects the operation of each the memory block means, and changes the state of its output when the converter converts the amount of the runlength data in M scanning lines.

Moreover, it is preferable that the apparatus further includes a high-speed memory block which forms a N bit signal by storing the dot signals in M scanning lines, and provides it to the memory block means, where N is a number which is smaller than M.

It is also preferable that the high-speed memory block means includes a plurality of high-speed memory devices for storing the amount of the dot signals in M scanning lines; a block controller for controlling each the high-speed memory device to operate on writing and reading; and an address counter for designating an address of each the high-speed memory device.

Practically, it is preferable that the high-speed memory block comprise pair of memory blocks which operates alternately storing the dot signals and generating the N bit signals. In this case, it is then preferable that the converter generates a select signal which selects the operation of each the high-speed memory block means, and changes the state of its output when the converter converts the amount of the runlength data in M scanning lines.

And it is preferable that the memory means includes a plurality of memory devices for storing the amount of the N bit signals in M scanning lines ; a block controller for controlling each the memory device to operate on writing and reading ; and an address counter for designating an address of each the memory device.

It is also preferable that the memory block means has a pair of memory blocks which operates alternately on storing the N bit signals and generating the dot data. In this case, it is preferable that the converter generates a select signal which selects the operation of each the memory block, and changes the state of its output when the converter converts the amount of the runlength data in M scanning lines.

Furthermore, it is preferable that the high-speed memory block comprise pair of memory blocks which operates alternately storing the dot signals and generating said N bit signals, and the memory block means has a pair of them which operates alternately on storing said N bit signals and generating the dot data. In this case, it is preferable that the converter generates a first select signal which selects the operation of each the memory block means, and changes the state of its output when the converter converts the amount of the runlength data in M scanning lines, and a second select signal which selects the operation of each the high-speed memory block means, and changes the state of its output when the converter converts the amount of the runlength data in N scanning lines.

Having the above-mentioned features, the present invention has the following useful advantages.

The constitution of the apparatus can be simplified remarkably, because it is sufficient that the runlength data is converted into the dot data by a converter in spite of the number of the exposure beams. As a result, it is useful for rise in productivity and decrease in cost of the apparatus, through simplification in producing and adjusting of it.

The apparatus can convert effectively the runlength data into the dot data, which is generated sequentially by a pair of memory block means with the alternative operation on writing and reading.

Furthermore, the apparatus can raise exposure speed for recording an image by the high-speed memory block means with improvement on the forming speed of the dot data.

Additionally, the apparatus never occur overflow in the memory devices because the amount of the dot data in M scanning lines is constant.

Other novel features and advantages of the present invention will become apparent in the course of the following detailed description taken together with the accompanying drawings, which are directed only to the understanding of the present invention and not to the restriction of the scope of the invention.

BRIEF DESCRIPTION OF THE DRAWINGS

These and other objects and features of the present invention will become apparent from the following description taken in conjunction with a preferred embodiment thereof with reference to the accompanying drawing, in which:

FIGS. 3-1 and 3-2, is a block diagram of an alternative preferred embodiment of the invention;

FIG. 4 is explanatory view showing the form of CAD data;

FIG. 5 is explanatory view showing the form of vector data; and

FIG. 6 is explanatory view showing the form of runlength data.

DETAILED DESCRIPTION OF THE INVENTION

Figure 1:
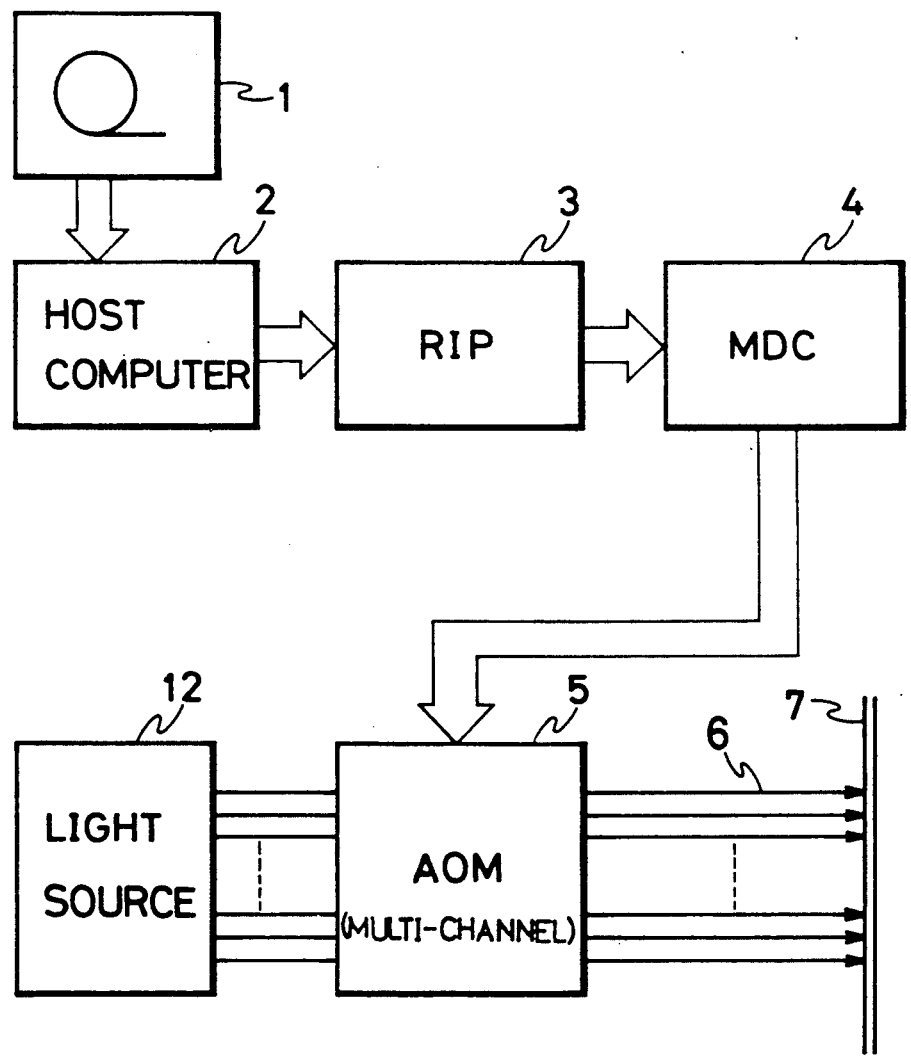
FIG. 1 is a block diagram of a image reproducing apparatus according to the present invention.

Referring to the drawing, FIG. 1 denotes the apparatus for reproducing an image. A magnetic tape 1 stores a plurality of CAD data created by the CAD system, wherein each CAD data consists of coordinate values (x1, y1), (x2, y2) defining both ends of the image line, which is shown in FIG. 4 for instance and the width (W) of the image line.

A host computer 2 converts each CAD data read out from the magnetic tape 1 into a vector data, which consists of a plurality of vectors along the outline of the image line, one of which for example, indicates vector ($\theta$, $\Delta x$) from the base coordinate value (x0, y0) shown in FIG. 5. The host computer 2 supplies the vector data to a raster image processor (hereinafter referred to as "RIP") 3.

RIP 3 converts the vector data into the runlength data, which consists of three kinds of elements, and is generated concerning unexposed portion 10 and exposed portion 11 along a scanning line 9 on an image 8 indicated by the binary data in white and black. A first element indicates whether a head of scanning line or not, a second element indicates whether the operation of scanning is exposing or unexposing. A third element indicates that the number of successive pixels, for example in FIG. 6, of unexposed portion on the scanning line 9 is the number of pixels involved in the portion of $\Delta$ y1, and similarly that the number of exposed portion on the scanning line 9 is the number of pixels involved in the portion of $\Delta$ y2. Moreover the runlength data is obtained in every scanning line arranged in parallel on a reproducing area, and RIP 3 supplies the runlength data to a multi dot data converter (hereinafter referred to as "MDC") 4.

MDC 4 converts the runlength data into a dot data, and delivers it to an acoustic optical modulator (hereinafter referred to as "AOM") 5. In this embodiment, the dot data consists of forty dots arranged in parallel. Moreover AOM 5 includes a driver (unshown), and is driven by the driver, which generates high frequency signals to modulate exposure beams according to the dot data.

Then AOM 5 modulates forty-channel exposure beams 6 emitted from a light source 12 according to the dot data generated by MDC 4. Namely AOM 5 emits the exposure beams 6, which consist of some exposure beams corresponding to the dot data generated by MDC 4, to a photosensitive material 7 to expose the pixels of an image. Thus the reproduction of an image is effected by repeating of above-mentioned exposing. In this case, forty pixels arranged in parallel are exposed in an exposure scanning line.

Figure 2:
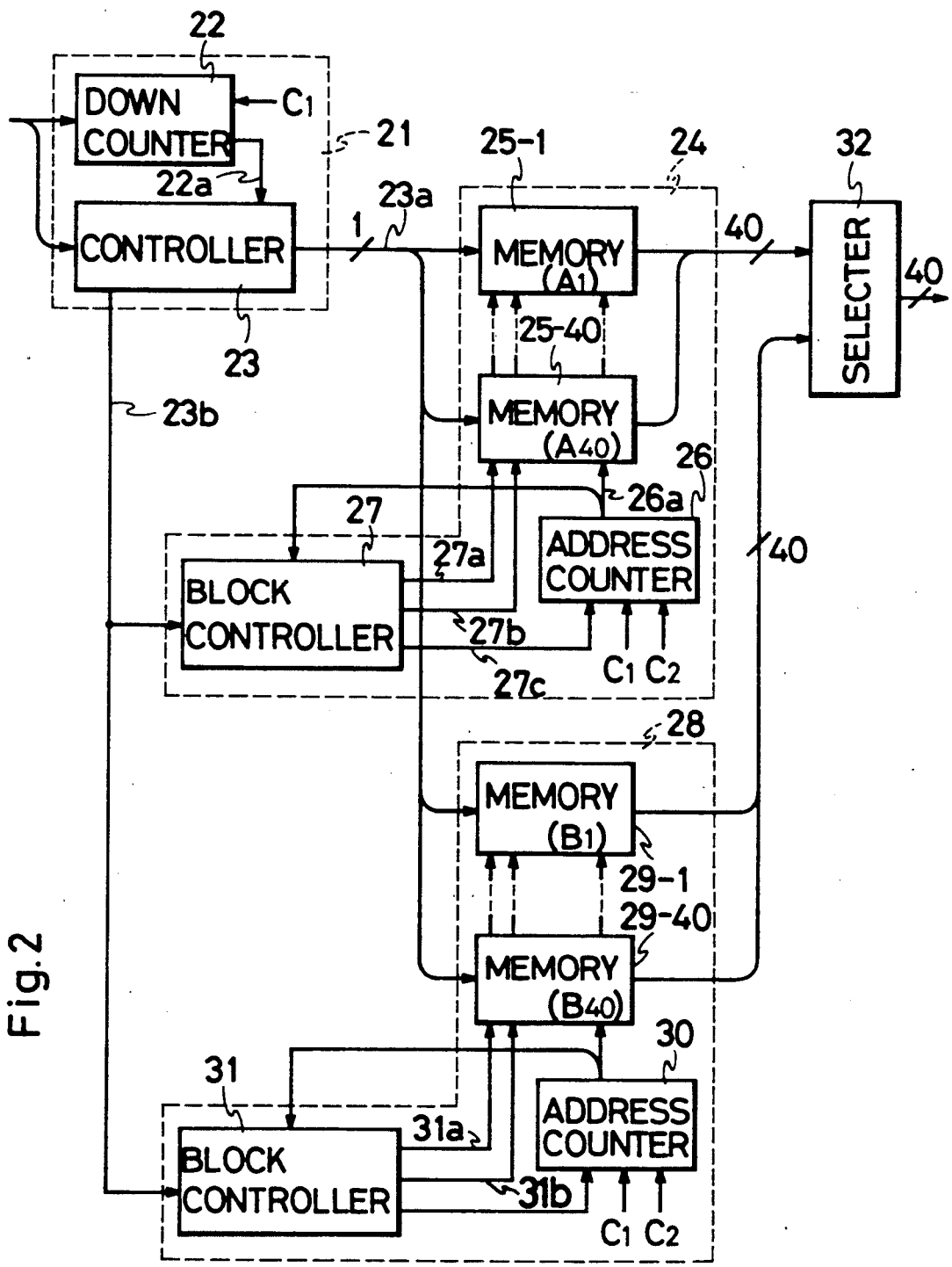
FIG. 2 is a block diagram of a preferred embodiment of the invention.

FIG. 2 shows a detailed diagram of MDC 4 shown in FIG. 1 A converter 21 comprises a down counter 22 which receives the third element of the runlength data, and a controller 23 which receives the first and second elements of the runlength data. The down counter 22 starts counting a clock signal C1 upon the receipt of the third element, and transmits a borrow signal 22a to the controller 23 when it counts the number of clock signals C1 corresponding to a value of the third element. The controller 23 generates a dot signal 23a which consists of one bit signal, and corresponds to the state of the second element while the down counter 22 is operating. Moreover the controller 23 generates a supplemental signal which supplements the dot signal 23a in a scanning line, if the sum of the values indicated by the third element in the scanning line is less than the number of pixels in the scanning line when the first element which indicates the head of the line is received. Furthermore the controller 23 generate a read write select signal 23b, and changes the state of output when it counts forty-first signal which indicates the head of the line in the first element (hereinafter referred to as "line feed signal") in each state.

The memory block 24 comprises forty memories 25-1 to 25-40 which store the dot signal 23a generated from the controller 23 in a while, an address counter 26 which supplies an address signal 26a to each memory 25-1 to 25-40 by counting either of the clock signal C1 and a clock signal C2, and the block controller 27 which transmits a chip select signal 27a, a read write signal 27b to each memory 25-1 to 25-40, and a reset signal 27c to the address counter 26. Also the memory block 28 comprises forty memories 29-1 to 29-40, an address counter 30 and a block controller 31, which is similar to the constitution of the memory block 24. Moreover each of memory 25-1 to 25-40 and 29-1 to 29-40 can store a one bit signal in each address.

The selecter 32 delivers a signal generated by the memory block 24 or the memory block 28 as a dot data to AOM 5.

In operation, the controller 23 initially generates the read write select signal 23b of the write state to enable the memory block 24 to store the dot signal 23a. Then the block controller 27 transmits the chip select signal 27a and the read write signal 23b, which synchronizes with the clock signal C1, to the memory 25-1 to enable it to store the dot signal 23a, and further the reset signal 27c to the address counter 26 to reset to an initial state.

Now the first and second elements are received by the controller 23 and the third element is received by the down counter 22 in accordance with the production of the runlength data in RIP 3. Then the controller 23 generates the dot signal 23a corresponding to the state of the second element to the memory 25-1. At the same time, the down counter 22 and the address counter 26 start counting the clock signal C1. Consequently, the one bit data corresponding to the state of the second element, namely white or black, is stored at the address designated by the address signal 26a in the memory 25-1 on every production of the clock signal C1. Of course, the memory 25-1 is capable of storing such data when it is applied to the read write signal 27b of the write state which synchronizes with the clock signal C1. The controller 23 stops generating the dot signal 23a in accordance with the generating of the borrow signal 22a in the down counter 22. In that case, the next runlength data is supplied to the down counter 22 and the controller 23, and some of one bit data are stored in the memory 25-1 by the above-mentioned operation. Thereafter, the memory 25-1 stores the amount of one bit data in a scanning line by repetition of the above-mentioned operation.

In such operation, the block controller 27 exchanges the memory 25-1 with the memory 25-2 (unshown) to yield the chip select signal 27a, and supplies the reset signal 27c to the address counter 26, when the address counter 26 generates the address signal 26a which indicates the last address of the memory 25-1. Thereafter according to the above-mentioned operation, the one bit data corresponding to each runlength data is stored at the address designated by the address signal 26a in each memory 25-2 to 25-40 sequentially.

In the state of storing operation in the memory 25-40, if the address signal 26a indicates the last address of that, the controller 23 will receive the line feed signal next. Then the controller 23 changes the state of generating the read write select signal 23b, because the controller 23 counts the forty-first line feed signal at that time. Thereby, the memory block 24 is selected for the read state, and the memory block 28 is selected for the write state from that time. Moreover, before the first changing for the state of the read write select signal 23b, the block controller 31 inhibits to generate the chip select signal 31a in order to prevent each memory 29-1 to 29-40 from generating unrelated data concerning an image.

In the write state for the memory block 28, the address counter 30 and the block controller 31 operate to store the one bit data in each memory 29-1 to 29-40. This operation is similar to the above-mentioned operation of the address counter 26 and the block controller 27 in the write state for the memory block 24.

Meanwhile, the memory block 24 is the read state. The block controller 27 supplies the chip select signal 27a to each memory 25-1 to 25-40 and the read write signal 27b which indicates the state of read successively to each memory 25-1 to 25-40. Of course it also transmits the reset signal 27c to the address counter 26 firstly. Then the address counter 26 starts counting the clock signal C2, which has a low frequency compared with a frequency of the clock signal C1, and delivers the address signal 26a to each of memory 25-1 to 25-40. In this case, each of them supplies the one bit data to the selecter 32 sequentially, according to the change of the address signal 26a by counting the clock signal C2. They correspond to the dot data which consists of forty bit signal. Consequently, the selecter 32 transmits the dot data to AOM 5 sequentially in order to control the modulation of the exposure beams 6.

In this operation, the memory block 24 supplies the dot data corresponding to the amount of pixels in forty scanning lines, and at the same time, the memory block 28 stores the one bit data corresponding to the amount of pixels in next forty scanning lines. The controller 23 changes the state of generating the read write select signal when it counts the forty-first line feed signal. Then the memory block 24 is selected for the write state, and the memory block 28 is selected for the read state again.

Consequently, the memory block 24 operates again to store the amount of the one bit data in next forty scanning lines, and the memory block 28 operates to supplies the dot data, which consists of forty one bit data stored in each memory 29-1 to 29-40 in the former state, to AOM 5 through the selecter 32. In this case, the block controller 31 and the address counter 30 control the operation of reading the one bit data by the same operation of the block controller 27 and the address counter 26 in the above-mentioned read state. The controller 23 changes the state of generating the read write select signal 23b again when it counts the forty-first line feed signal. Then according to the above-mentioned operation, MDC 4 supplies thereafter the dot data to AOM 5 sequentially by repetition of this operation.

Figures 1, 3:
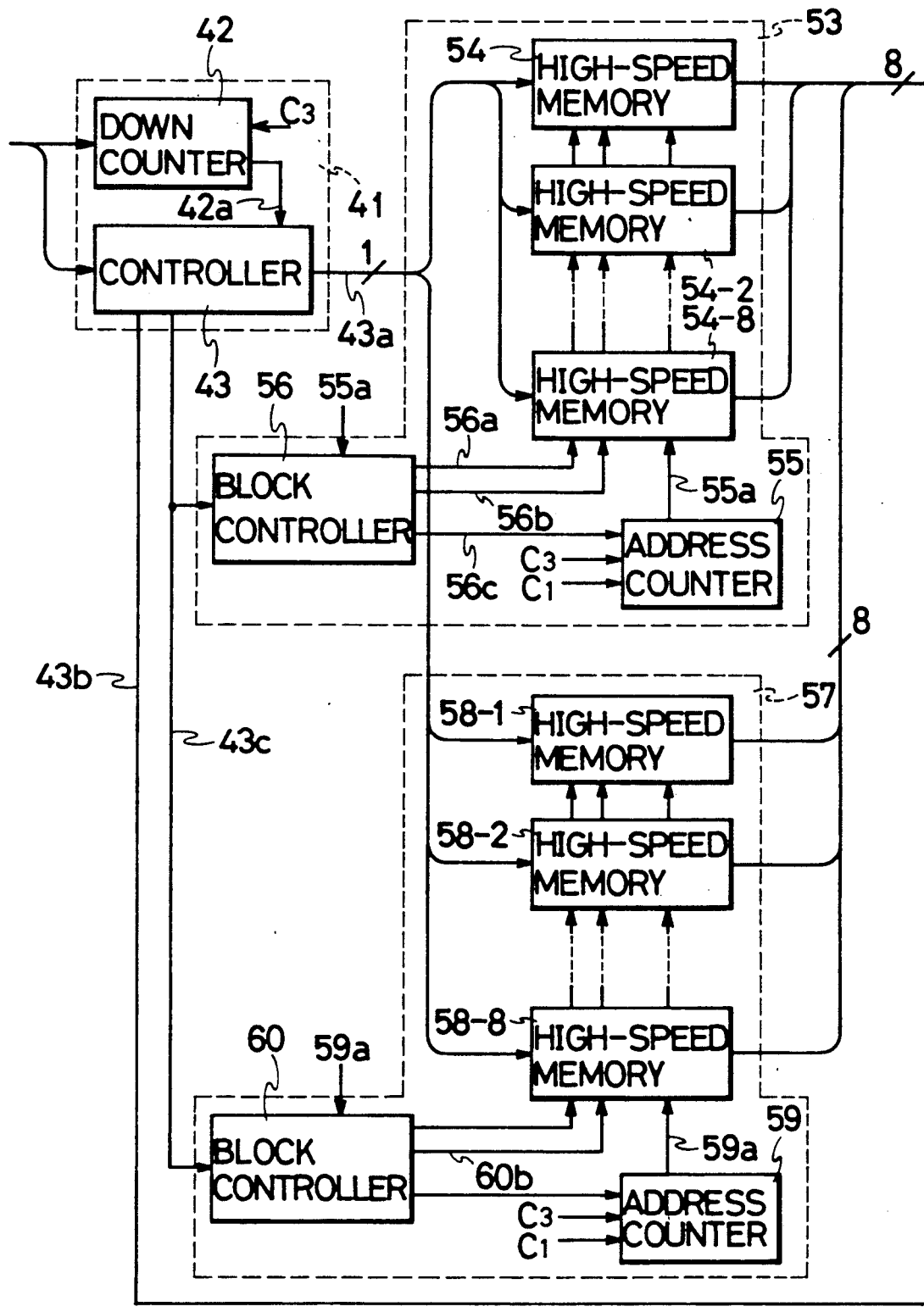
FIG. 3, comprising

FIG. 3 shows another detailed diagram of MDC 4 shown in FIG. 1 which has a significant difference from the first embodiment previously described. The difference between MDC of FIG. 3 and the first embodiment is that there are two high-speed memory blocks 53 and 57 between a converter 41 and two memory blocks 44 and 48 basically. Accordingly, this embodiment can quicken the process of conversion compared with the first one.

A converter 41 is nearly the same as the converter 21 shown in FIG. 2 in construction and operation, and comprises a down counter 42 and a controller 43, which are also nearly the same as the down counter 22 and the controller 23 respectively. The differences among them are that the down counter 42 provides for a clock signal C3 instead of the clock signal C1, and the controller 43 generates additionally a second read write select signal (hereinafter referred to as "second select signal") 43c. Moreover, the frequency of the clock signal C3 is higher than that of the clock signal C1, and the controller 43 changes the state of the second select signal 43c when it counts ninth line feed signal in each state. Of course, the controller 43 generates the first select signal 43b which corresponds to the read write select signal 23b.

A memory block 44 is nearly the same as the memory block 24 shown in FIG. 2 in construction and operation, and comprises eight memories 45-1 to 45-5, and address counter 46 and a block controller 47, which are also nearly the same as the memories 25-1 to 25-40, the address counter 26 and the block controller 27 respectively. Then the differences among them are that each memory 45-1 to 45-5 stores eight bit signal in each address, and the address counter 46 counts the clock signal C4 instead of the clock signal C2 in the read state. The frequency of the clock signal C4 is higher than that of the clock signal C2, and lower than that of the clock signal C1. Moreover a memory block 48 also comprises eight memories 49-1 to 49-5, an address counter 50 and a block controller 51 similarly.

Furthermore a high-speed memory block 53 is also nearly the same as the memory block 24 in construction and operation, and the difference is mainly that there are eight high-speed memories 54-1 to 54-8 which have a short access time for writing and reading instead of forty memories 25-1 to 25-40, and have the same total memory capacity as that of each memory 45-1 to 45-5 or each memory 49-1 to 49-5. The high-speed memory block 53 comprises eight memories 54-1 to 54-8 which store the dot signal 43a generated from the controller 43 in a while, an address counter 55 which supplies an address signal 55a to each high-speed memory 54-1 to 54-8 by counting either of the clock signal C1 and C3, and a block controller 56 which transmits a chip select signal 56a, a read write signal 56b to each high-speed memory 54-1 to 54-8, and a reset signal 56c to the address counter 55. In each high-speed memory 54-1 to 54-8, they can store one bit signal in each address. Moreover, a high-speed memory block 57 comprises eight high-speed memories 58-1 to 58-8, an address counter 59, and a block controller 60, which is similar to the high-speed memory block 53 in the constitution.

Additionally, a selecter 52 is the same as the selecter 32 shown in FIG. 2.

Then the operation of FIG. 3 is as follows. The controller 43 initially generates the first and second select signals 43b and 43c of the write state to enable the memory block 44 and high-speed memory block 53 to store the dot signal 43a. Accordingly, the block controller 56 supplies the chip select signal 56a and read write signal 56b, which synchronizes with the clock signal C3, to the high-speed memory 54-1 to enable it to store the dot signal 43a, and the reset signal 56c to the address counter 55 to reset to a initial state. The block controller 47 also supplies the chip select signal 47a and the read write signal 47b to enable it to store an eight bit signal, and the reset signal 47c to the address counter 46.

Consequently, based on the generated dot signal 43a by the controller 43, the high-speed memory 54-1 stores sequentially the one bit data at the address designated by the address signal 55a every time the clock signal C3 is generated. When the address counter 55 generates the address signal 55a which indicates the last address of the high-speed memory 54-1, the block controller exchanges the high-speed memory 54-1 with the high-speed memory 54-2 to provide for the chip select signal 56a. As a result the one bit data are stored in the high-speed memory 54-2, based on the generated dot signal 43a, and thereafter are stored in each high-speed memory 54-2 to 54-8 sequentially by that operation similarly.

In the state of storing operation in the high-speed memory 54-8, if the address signal 55a indicates the last address of one, the controller 43 will receive the line feed signal next. Then the controller 43 changes the state of generating the second select signal 43c, because it counts the ninth line feed signal at that time. As a result the high-speed memory block 53 is selected for the read state, and the high-speed memory block 57 is selected for the write state from that time. Moreover, before the first changing for the state of the second select signal 43c, the block controller 60 inhibits to generate the chip select signal 60b in order to prevent the memory 45-1 from storing unrelated data.

In the write state for the high-speed memory block 57, the address counter 59 and the block controller 60 operate to store the one bit data in each high-speed memory 58-1 to 58-8, based on the generated dot signal 43a. This operation is similar to the above-mentioned operation of the address counter 55 and the block controller 56 in the write state for the high-speed memory block 53.

Meanwhile, the high-speed memory block 53 is the read state. The block controller 56 supplies the chip select signal 56a and the read write signal 56b, which indicates the read state successively, to each high-speed memory 54-1 to 54-8. The address counter 55 starts counting the clock signal C1 from an initial state, and transmits the address signal 55a to each of high-speed memory 54-1 to 54-8. In this case, each of them delivers the one bit data to the memory 45-1 sequentially, according to the change of the address signal 55a. They correspond totally to the eight bit signal which is adaptable for each memory 45-1 to 45-5 or each memory 49-1 to 49-5, and they are stored at the address which is designated by the address signal 46a in the memory 45-1 on the production of clock signal C1.

In this operation, the high-speed memory block 53 supplies the eight bit signals corresponding to the amount of pixels in eight scanning lines to the memory 45-1, and at the same time, the high-speed memory block 57 stores the one bit data which correspond to the amount of pixels in the next eight scanning lines. Then the controller 43 changes the state of generating the second select signal 43c when it counts the ninth line feed signal in that state. The block controller 47 exchanges the memory 45-1 with the memory 45-2 (unshown) to provide for the chip select signal 47b when the address counter 46 generates the address signal which indicates the last address in the memory 45-1.

Consequently, the high-speed memory block 53 operates again to store the amount of the one bit data in the next eight scanning lines, and at the same time, the high-speed memory block 57 operates to supply the eight bit signals, which are stored in each high-speed memory 58-1 to 58-8 in the former state, to the memory 45-2, and it stores them. In this case, the address counter 59 and the block controller 60 control the operation for reading the eight bit signals by the similar operation of the address counter 55 and the block controller 56 in the read state. The controller 43 changes the state of generating the second select signal 43c further when it counts the ninth line feed signal in that state. Thereafter each memory 45-3 to 45-5 stores the eight bit signals, which are based on the dot signal 43a generated by the controller 43, through either of the high-speed memory block 53 and 57 according to the above-mentioned operation. In that operation, the memory block 44 stores the amount of the eight bit signals which correspond to pixels in the forty scanning lines, and then the controller 43 changes the first select signal 43b when it counts the forty-first line feed signal in that state.

Consequently the memory block 44 supplies the dot data, which consists of the five signals of eight bit generated by each memory 45-1 to 45-5, to AOM 5 through the selecter 52 by the similar operation to that of the memory block 24 of FIG. 2, except where the address counter 46 counts the clock signal C4 instead of the clock signal C2. Moreover, the memory block 48 operates to store the amount of the eight bit signals which correspond to the pixels in the next forty scanning lines based on the above-mentioned operations of the memory block 44 and both the high-speed memory block 53 and 57. Then the controller 43 changes again the state of generating the first select signal 43b when it counts the forty-first line feed signal in this state. Accordingly in the next state, the memory block 44 operates to store the eight bit signals, and the memory block 48 operates to supply the dot data to AOM 5 through the selecter 52.

Then the embodiment of FIG. 3 applies thereafter the dot data to AOM 5 by repetition of the above-mentioned operation, which mainly includes the changing in the state of each high-speed memory block 53 and 57 at every eight scanning lines, and the changing in the state of each memory block 44 and 48 at every forty scanning lines.

According to the above-mentioned operation of this embodiment, each memory block 44 and 48 can store the eight bit signal in an address, because each high-speed memory block 53 and 57 converts the one bit signal based on the dot signal 43a into the eight bit signal at high speed. Then the number of writing signals in each memory block 44 and 48 is less than that of the first embodiment, and access time of data in each memory block 44 and 48 is naturally shortened compared with the first one. As a result, exposure scanning speeds up according to this embodiment by making it possible to reduce the time required for supplying the dot data to AOM 5.

If the present invention is applied to a flat bed type scanning apparatus, it is preferred that the designation of read address reverses to the designation of write address in each memory block 28 and 48, which provides for the dot data on even-numbered exposure scanning line, in order to enable an exposure head to expose in both scanning direction. For example, it is preferable to adopt a up-down counter instead of the address counter 30 and 50, and it counts one of the clock signals C1, C2 and C4 under direction which corresponds to the state of each the read write signal 31b and 51b.

A multi-channel light modulator which is applied in the present invention is as follows. For example, (a) Acoustic Optical Modulator
(b) Electric Optical Modulator
(c) Optical switch using PLZT
(d) Liquid Crystal Light Valve and, they modulate independently each of light beams according to the dot data. It is also possible to emit the multi-channel light beams by controlling independently to drive each of the light beam emitter, such as LASER, LED, according to the dot data. Moreover, a multi-channel light beams is obtained by dividing a light beam with a beam splitter, a slit and so on.

This invention may be practiced or embodied in still other ways without departing from the spirit or essential character thereof. For example, while in the illustrated preferred embodiments, though the generating of each of the dot signal 23a and 43a is controlled by each of the down counter 22 and 42 respectively, it may alternatively be done by a up counter and a coincidence detector which generates a detection signal instead of each of the hollow signal 22a and 42a when the value of count signal generated by the up counter correspond to the value indicated by the third element of a runlength data. Furthermore, though the dot data is generated by the two memory blocks 24 and 28 or the memory blocks 44 and 48 by turns, it may alternatively be done by a memory block or more than three memory blocks. Also, means other than those described and illustrated herein will readily suggest themselves to those skilled in the art. The preferred embodiments described herein are therefore illustrative and not restrictive, the scope of the invention being indicated by the appended claims and all variations which come within the meaning of the claims are intended to be embraced therein.

What is claimed is:

1. An image data processing apparatus for generating dot data from runlength image data for controlling exposure beams which record an image through scanning, said apparatus comprising:
   a converter responsive to the runlength image data for generating a dot signal, wherein one state of the dot signal and the length of said one state correspond to said runlength image data; and
   memory means for serially receiving the dot signal from the converter to form by storing and to generate by outputting dot data in M scanning line format, wherein M is the number of said exposure beams, wherein said memory means comprises
   (i) a plurality of memory devices for storing the dot signals of M scanning lines;
   (ii) a block controller for controlling an operation of said memory devices, said block controller selecting one device at a time from among the memory devices to operate to store the dot signal from said converter, and selecting all of the memory devices to operate to output in parallel the dot signals of M scanning lines, wherein the dot signals of M scanning lines represent said dot data; and
   (iii) an address counter for designating an address of the memory devices.

2. An image data processing apparatus as in claim 1, wherein said memory means comprises a pair of memory blocks which operate alternately for storing said dot signal and outputting said dot data.

3. An image data processing apparatus as in claim 2, wherein said converter generates a select signal which selects an operation of each said memory block, said select signal changing the state of its output when said converter generates said dot signals of M scanning lines.

4. An image data processing apparatus for generating dot data from runlength image data for controlling exposure beams which record an image through scanning, said apparatus comprising:
   (A) a converter responsive to the runlength image data for generating a dot signal, wherein one state of the dot signal and the length of said one state correspond to said runlength image data;
   (B) first memory means responsive to the dot signal for forming an N bit signal by storing said dot signal corresponding to N of the scanning lines, wherein said first memory means comprises:
   (i) a plurality of memory devices for storing the dot signals of N scanning lines;
   (ii) a block controller for controlling the operation of said plurality of memory devices, said block controller selecting one memory device at a time from among said plurality of memory devices to operate to store the dot signal from said converter, and selecting all of the memory devices to operate to output in parallel the dot signals of N scanning lines, wherein the dot signals of N scanning lines represent said dot data; and (iii) an address counter for designating an address of said plurality of memory devices; and (C) second memory means, responsive to the N bit signal, for forming dot data in M scanning line format, wherein M is the number of said exposure beams and N is a number smaller than M.

5. An image data processing apparatus as in claim 4, wherein said first memory means comprises a pair of memory blocks which operate alternately for storing said dot signal and for outputting the N bit signal.

6. An image data processing apparatus as in claim 5, wherein said converter generates a select signal which selects an operation of each memory block, said select signal changing output state when said converter generates said dot signals in N scanning lines.

7. An image data processing apparatus for generating dot data from runlength image data for controlling exposure beams which record an image through scanning, said apparatus comprising:

(A) a converter responsive to the runlength image data for generating a dot signal, wherein one state of the dot signal and the length of said one state correspond to said runlength image data;

(B) first memory means responsive to the dot signal for forming an N bit signal by storing said dot signal corresponding to N of the scanning lines; and (C) second memory means, responsive to the N bit signal, for forming dot data in M scanning line format, wherein said second memory means comprises (i) a plurality of memory devices for storing the N bit signals of M scanning lines;

(ii) a block controller for controlling the operation of said memory devices, said block controller selecting one device at a time from among the memory devices to operate to store the N bit signal from said first memory memory means, and selecting all of the memory devices to operate to output in parallel the N bit signals of M scanning lines, wherein the N bit signals of M scanning lines represent said dot data; and (iii) an address counter for designating an address of the memory devices, wherein M is the number of said exposure beams and N is a number smaller than M.

8. An image data processing apparatus as in claim 7, wherein said second memory means comprises a pair of memory blocks which operate alternately for storing said N bit signal and outputting said dot data.

9. An image data processing apparatus as in claim 8, wherein said converter generates a select signal which selects an operation of each memory block, said select signal changing output state when said converter generates said dot signals in M scanning lines.

* * * * *